(12) United States Patent
Gehrmann

(10) Patent No.: US 11,750,655 B2
(45) Date of Patent: Sep. 5, 2023

(54) REGISTRATION OF DATA AT A SENSOR READER AND REQUEST OF DATA AT THE SENSOR READER

(71) Applicant: Fingerprint Cards AB, Gothenburg (SE)

(72) Inventor: Christian Gehrmann, Lund (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 207 days.

(21) Appl. No.: 16/968,676

(22) PCT Filed: Feb. 11, 2019

(86) PCT No.: PCT/SE2019/050114
§ 371 (c)(1),
(2) Date: Aug. 10, 2020

(87) PCT Pub. No.: WO2019/160479
PCT Pub. Date: Aug. 22, 2019

(65) Prior Publication Data
US 2021/0006597 A1    Jan. 7, 2021

(30) Foreign Application Priority Data
Feb. 13, 2018  (SE) .................... 1850155-1

(51) Int. Cl.
*H04L 9/40* (2022.01)
*H04L 9/30* (2006.01)
*H04L 9/32* (2006.01)

(52) U.S. Cl.
CPC ............. *H04L 63/20* (2013.01); *H04L 9/30* (2013.01); *H04L 9/3263* (2013.01); *H04L 63/0861* (2013.01)

(58) Field of Classification Search
CPC ......... H04L 63/20; H04L 9/30; H04L 9/3263; H04L 63/0861; H04L 9/14; H04L 9/3231;
(Continued)

(56) References Cited

U.S. PATENT DOCUMENTS 6,167,517 A   12/2000  Gilchrist et al.
8,868,927 B1  10/2014  Lee et al.
(Continued)

FOREIGN PATENT DOCUMENTS

CN   101087194 A   12/2007
CN   102833235 A   12/2012
(Continued)

OTHER PUBLICATIONS

Nguyen, N. et al., "Untraceable biometric-based three-party authenticated key exchange for dynamic systems," Peer-to-Peer Netw. Appl. (2018), vol. 11, pp. 644-663.
(Continued)

*Primary Examiner* — Anthony D Brown
(74) *Attorney, Agent, or Firm* — RMCK Law Group, PLC

(57) ABSTRACT

Mechanisms for requesting, by a client device, registration of identified data at a sensor reader. A request command is sent from the client device and to the sensor reader pertaining to a registration operation to be performed on identified data at the sensor reader. A security policy is assigned to the identified data by the sensor reader. A first security protected object and a second security protected object of the identified data are created by the sensor reader and based on the request command and the security policy. The second security protected object is sent, by the sensor reader, to the client device. The first security protected object is sent, by the sensor reader, towards the trusted server. The trusted server, upon reception of the first security protected object, verifies (Continued)

that the sensor reader that created the first security protected object has a security trusted relationship with the trusted server.

19 Claims, 8 Drawing Sheets

(58) Field of Classification Search
CPC ............. H04L 63/0428; H04L 63/0823; H04L 9/0866; H04L 2209/16; G07C 9/257; G06Q 20/40145; G06Q 20/3278; G06Q 20/40; G06F 21/32; G06V 40/53
See application file for complete search history.

(56) References Cited

U.S. PATENT DOCUMENTS

| | | | |
|---|---|---|---|
| 9,928,379 B1 | 3/2018 | Hoffer | |
| 11,252,239 B2* | 2/2022 | Pak | ........................ H04L 63/166 |
| 2007/0050303 A1* | 3/2007 | Schroeder | ............. G07F 7/1016 |
| | | | 705/67 |
| 2008/0222711 A1* | 9/2008 | Michaelis | ........... H04L 63/0492 |
| | | | 726/7 |
| 2009/0319782 A1 | 12/2009 | Lee | |
| 2011/0016317 A1 | 1/2011 | Abe | |
| 2014/0354401 A1 | 12/2014 | Soni et al. | |
| 2015/0082024 A1 | 3/2015 | Smith | |
| 2015/0341349 A1 | 11/2015 | Mandal et al. | |
| 2016/0180078 A1 | 6/2016 | Chhabra et al. | |
| 2016/0277930 A1 | 9/2016 | Li et al. | |
| 2018/0033013 A1 | 2/2018 | Park et al. | |
| 2019/0268328 A1* | 8/2019 | Hussein | ................ H04L 63/104 |

FOREIGN PATENT DOCUMENTS

| | | |
|---|---|---|
| CN | 105681300 A | 6/2016 |
| CN | 107665426 A | 2/2018 |
| RU | 2633098 C1 | 10/2017 |
| WO | 2009139779 A1 | 11/2009 |
| WO | 2014143950 A1 | 9/2014 |
| WO | 2017120011 A1 | 7/2017 |
| WO | 2018156067 A1 | 8/2018 |
| WO | WO-2018156067 A1 * | 8/2018 ............. G06F 21/32 |

OTHER PUBLICATIONS

PCT International Search Report and Written Opinion dated Apr. 25, 2019 for International Application No. PCT/SE2019/050114, 13 pages.

* cited by examiner

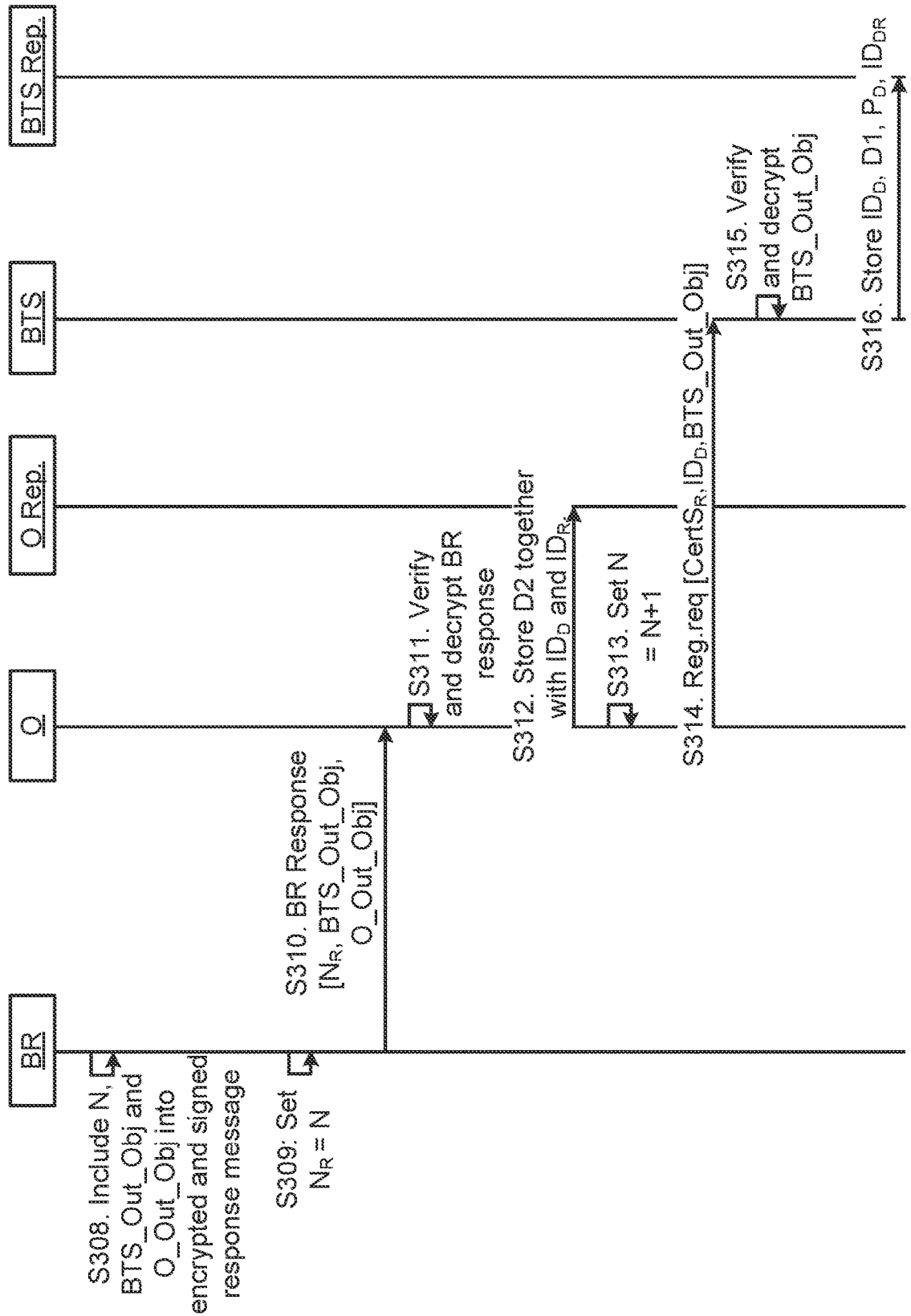

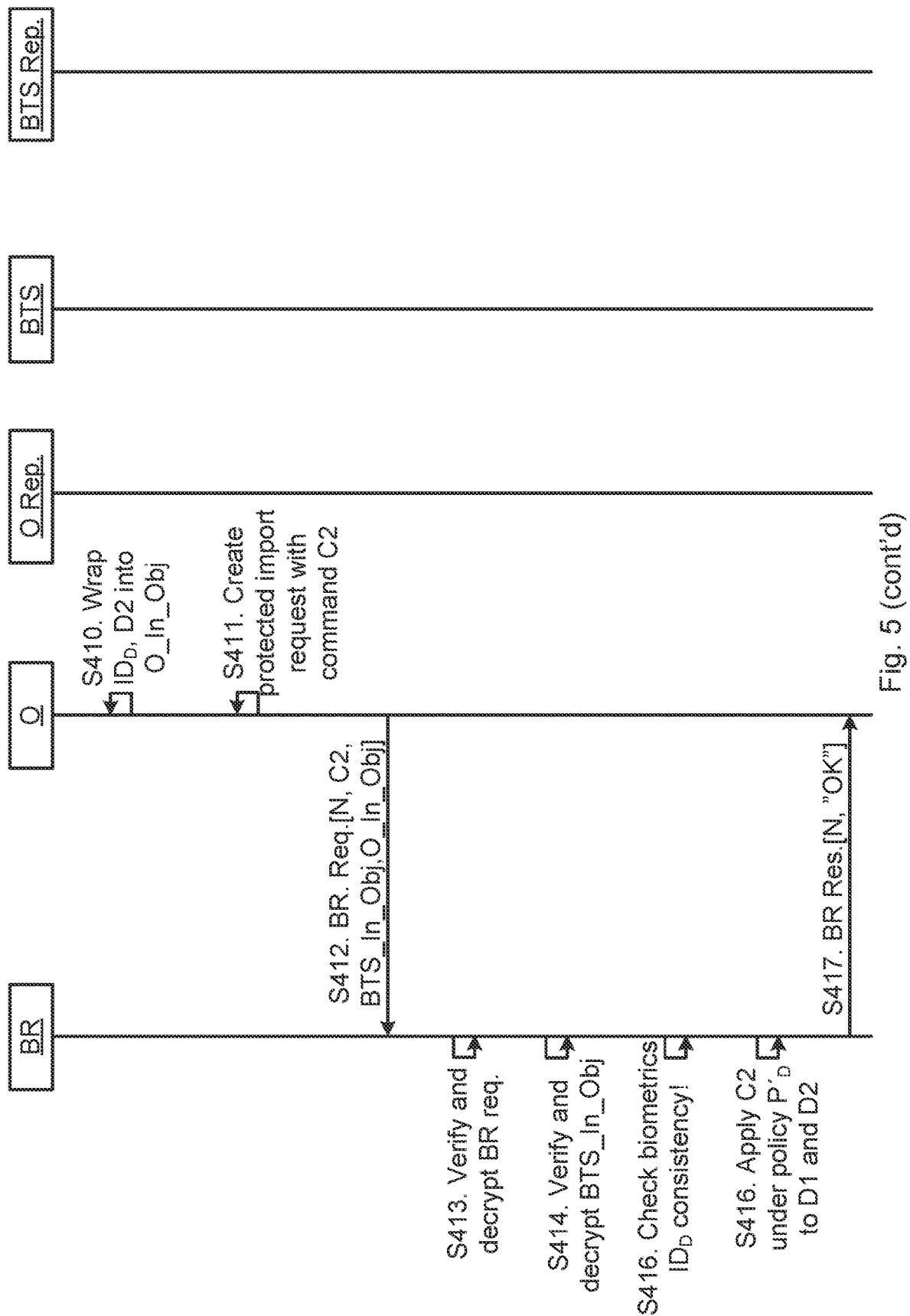

REGISTRATION OF DATA AT A SENSOR READER AND REQUEST OF DATA AT THE SENSOR READER

CROSS-REFERENCE TO RELATED APPLICATIONS

This application is a 371 U.S. National Stage of International Application No. PCT/SE2019/050114, filed Feb. 11, 2019, which claims priority to Swedish Patent Application No. 1850155-1, filed Feb. 13, 2018. The disclosures of each of the above applications are incorporated herein by reference in their entirety.

TECHNICAL FIELD

Embodiments presented herein relate to mechanisms for requesting, by a client device, registration of identified data at a sensor reader. Embodiments presented herein further relate mechanisms for requesting, by a client device, identified data to be provisioned to a sensor reader.

BACKGROUND

In scenarios with multiple users, each represented by a client device, and multiple identification devices, each defined by a sensor reader, there could be a need to enroll data on one sensor reader and then use this data on another sensor reader. Additionally or alternatively, there could be a need to use this data on a central server. One need to use the data is for matching purposes, where the thus enrolled data is to be matched to, or compared to, other data. However, some types of data, such as biometrics data, might be security sensitive and the usage of the data should thus be under strict security control whenever it leaves the sensor reader, and typically also when it is stored on the sensor reader.

For example, it could be difficult to ensure that data that can leave the secure execution environment of the sensor reader is protected from illegal access or use.

For example, it could be difficult to ensure that data that is loaded into a secure execution environment of the sensor reader is correct (thus representing valid data) and that the operations that are assumed to be performed on this data indeed are authorized by the data end-user.

Hence, there is a need for mechanisms enabling secure handling of data with relation to client devices and sensor readers.

SUMMARY

An object of embodiments herein is to provide secure handling of data with relation to client devices and sensor readers that solves, or at least mitigates, the issues noted above.

According to a first aspect there is presented a method for requesting, by a client device, registration of identified data at a sensor reader. The client device and the sensor reader have a security trusted relationship with a trusted server. The method comprises sending a request command, from the client device and to the sensor reader, the request command pertaining to a registration operation to be performed on identified data at the sensor reader. The method comprises assigning, by the sensor reader, a security policy to the identified data. The method comprises creating, by the sensor reader and based on the request command and the security policy, a first security protected object and a second security protected object of the identified data. The method comprises sending, by the sensor reader, the second security protected object to the client device. The method comprises sending, by the sensor reader, the first security protected object towards the trusted server. The method comprises verifying, by the trusted server and upon reception of the first security protected object, that the sensor reader that created the first security protected object has a security trusted relationship with the trusted server.

According to a second aspect there is presented a method according to the first aspect comprising those steps performed by the client device.

According to a third aspect there is presented a method according to the first aspect comprising those steps performed by the sensor reader.

According to a fourth aspect there is presented a method for requesting, by a client device, identified data to be provisioned to a sensor reader. The client device and the sensor reader have a security trusted relationship with a trusted server. The method comprises sending a first request command, from the client device and to the trusted server, the first request command pertaining to identified data to be provided to the sensor reader and a first provisioning operation to be performed by the sensor reader on the identified data. The method comprises retrieving, by the trusted server, a first data item, wherein the first data item is related to the identified data. The method comprises verifying, by the trusted server, that the first request command complies with a security policy for the identified data. The method comprises creating, by the trusted server and based on the security policy, a first security protected object of the first data item. The method comprises sending, from the trusted server and to the client device, the first security protected object. The method comprises forwarding, by the client device, the first security protected object to the sensor reader. The method comprises extracting, by the sensor reader and from the first security protected object, the first data item.

According to a fifth aspect there is presented a method according to the fourth aspect comprising those steps performed by the client device.

According to a sixth aspect there is presented a method according to the fourth aspect comprising those steps performed by the sensor reader.

According to a seventh aspect there is presented a method according to the fourth aspect comprising those steps performed by the trusted server.

According to an eight aspect there is presented client device comprising processing circuitry configured to perform the method according to at least one of the second aspect and the fifth aspect.

According to a ninth aspect there is presented sensor reader comprising processing circuitry configured to perform the method according to at least one of the third aspect and the sixth aspect.

According to a tenth aspect there is presented trusted server comprising processing circuitry configured to perform the method according to the seventh aspect.

According to an eleventh aspect there is presented a computer program comprising computer program code which, when run on processing circuitry, causes the device, node, or entity in which the processing circuitry is provided, to perform a method according to at least one of the first aspect to the seventh aspect.

According to a twelfth aspect there is presented a computer program product comprising a computer program according to the eleventh aspect and a computer readable storage medium on which the computer program is stored. The computer readable storage medium might be a non-transitory computer readable storage medium.

Advantageously these methods, these sensor readers, these client devices, these trusted servers and these computer programs provide secure handling of the identified data.

Advantageously these methods, these sensor readers, these client devices, these trusted servers and these computer programs enable the sensor reader only to accept operation request from the assigned client device and no other entities.

Advantageously, while the client device can request operations on data items, it is never in control of the security policy enforcement on such data items. Hence, a compromised execution environment used by the client device will not completely destroy the security, such as leakage of sensitive information.

Advantageously, whenever data is loaded to a sensor reader, the sensor reader has guarantees from the trusted server that it can safely load and use the data, even if the request for loading the data comes from a potential compromised client device.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

The following notation will be used hereinafter:

BR: Sensor reader having a secure execution environment
O: Client device
BTS: Trusted server
D: Sensor data
D1: First sensor data part
D2: Second sensor data part
$P_D$: Sensor data usage policy applied to the data (D)
$ID_D$: A unique identifier for the data (D)
C: Operation to be performed on the data (D)
$T_R$: Monotonic counter maintained by the sensor reader (BR)
$(PrE_R, PkE_R)$: Private/public encryption key pair of the sensor reader (BR)
$CertE_R$: Public key encryption certificate certifying $PkE_R$ and including $ID_R$ of the sensor reader (BR)
$(PrS_R, PkS_R)$: Private/public signing key pair of the sensor reader (BR)
$CertS_R$: Public key signature certificate certifying $PkS_R$ and including $ID_R$ of the sensor reader (BR)
$(PrE_{BTS}, PkE_{BTS})$: Private/public encryption key pair of the trusted server (BTS)
$PrS_{BTS}, PkS_{BTS})$: Private/public signing key pair of the trusted server (BTS)
$(PrE_{OR}, PkE_{OR})$: Private/public encryption key pair of the client device (O)
$CertE_{OR}$: Public key encryption certificate certifying $PkE_{EOR}$ and including $ID_{OR}$ of the client device (O)
$(PrS_{OR}, PkS_{OR})$: Private/public signing key pair of the client device (O)
$CertS_R$: Public key signature certificate certifying $PkS_R$ and including $ID_{OR}$ of the sensor reader (BR)
h: Secure one-way hash function
$ID_R = h(PkS_R)$: Unique identity of the sensor reader (BR)
$ID_{OR} = h(PkS_{OR})$: Unique identity of the client device (O)

Figure 1:
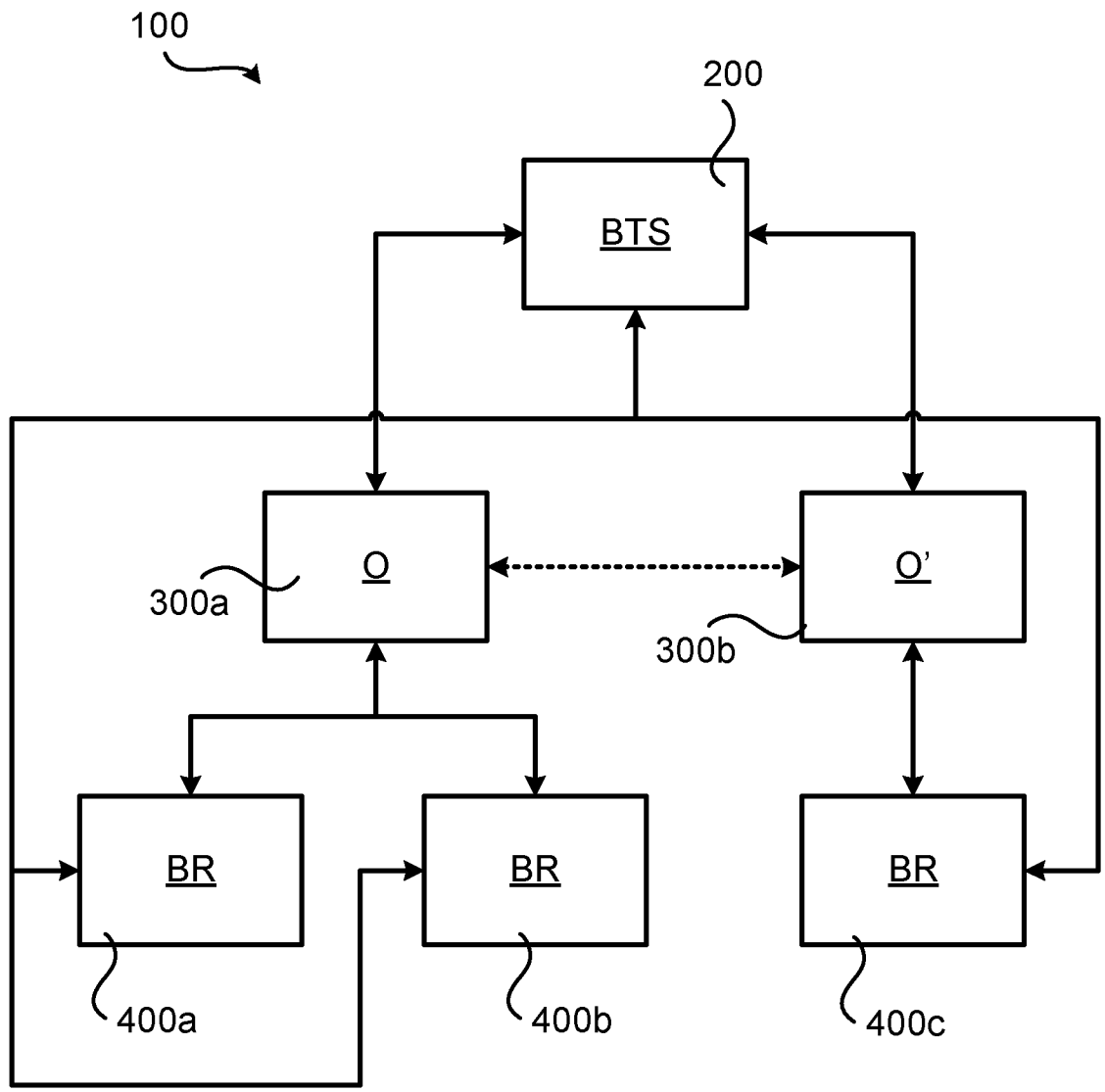
FIG. 1 is a schematic diagram illustrating a communications network according to embodiments.

FIG. 1 is a schematic diagram illustrating a communications network 100 where embodiments presented herein can be applied. The communications network 100 comprises a trusted server 200, client devices 300a, 300b and sensor readers 400a, 400b, 400c. As the skilled person understands, the communications network 100 could comprise a plurality of client devices 300a, 300b and a plurality of sensor readers 400a, 400b, 400c. Examples of client devices 300a, 300b include, but are not limited to, personal communications devices, such as smartphones, stationary personal computers, laptop computers, notebook computers, and tablet computers. Examples of sensor readers 400a, 400b, 400c will be provided below.

The herein disclosed embodiments are based on that the secure executions environments at the sensor readers 400a, 400b, 400c are preconfigured with trust relations through public keys with the trusted server 200 and the respective owner, as defined by the client device 300a, 300b, of each individual sensor reader 400a, 400b, 400c. In FIG. 1 the client devices 300a, 300b and the sensor readers 400a, 400b, 400c have a security trusted relationship with the trusted server 200 according to the double directed solid line arrows. As is known in the art, there could be different ways to establish a trusted relationship. For example, as disclosed above the secure executions environments at the sensor readers 400a, 400b, 400c are preconfigured with trust relations through public keys with the trusted server and the respective owner, as defined by the client device 300a, 300b, of each individual sensor reader 400a, 400b, 400c. Hence, as follows from this example, the term security trusted relationship could, for example, imply a trust being created by means of public keys being shared between the parties having the trusted relationship and thus that the security trusted relationship is a public key based trusted relationship (where the security thus is provided by the public key). The double directed dotted line arrow in FIG. 1 symbolizes a delegation of trust from one of the client devices 300*a* to another one of the client devices 300*b*. The sensor readers 400*a* all have a trust relation to the single trusted server 200, but all sensor reader 400*a*, 400*b*, 400*c* might have the same or different client device 300*a*, 300*b*.

The client device 300*a* is assumed to issues operation requests towards one or more of its sensor readers 400*a*, 400*b*. The client device 300*a* is further assumed to issue operation requests towards the trusted server 200. All requests and responses are assumed to be communicated using self-protected objects. In this respect, object security means that data is not necessarily protected through a transport protection protocol such as for instance Transport Layer Security (TLS) or Internet Protocol security (IPSec) but instead the data to be protected is "wrapped" into a protected container allowing only legitimate receivers to "unwrap" the wrapped object as well as verifying the integrity of such objects.

A request command might have been preceded by a corresponding object request from the trusted server 200 and a response might be followed by sending a corresponding object request by the client device 300*a* to the trusted server 200. In the following a distinction will be made between two different, but still related, types of operations: 1) Registration of data from a sensor reader 400*a* at the trusted server 200, and 2) Operation requests on previously registered data (such as data import and data matching operations). The herein disclosed embodiments thus, for example, address issues of how to securely managed export and import of biometrics data from a processing unit connected to a biometrics sensor. In particular, mechanisms are disclosed for ensuring that export and import only is enabled when explicit authorized by the owner of the biometrics processing unit.

At least some of the herein disclosed embodiments are based on that whenever data can leave a secure execution environment of a sensor reader (defining a so-called data export), its usage is controlled by the security policy connected to the exported data.

At least some of the herein disclosed embodiments are based on that whenever data is loaded (defining a so-called data import), into the secure execution environment of a sensor reader, its usage is controlled by the security policy connected to the imported data. As the skilled person working with security based sensor systems understands, a "security policy" as such is a definition of what it means to be secure for a system, organization or other entity. For systems, the security policy addresses constraints on functions and flow among them, constraints on access by external systems and adversaries including programs and access to data by people. Ample examples of security policies will be provided below.

In some aspects, commands for operations on data are issued by a client device 300*a*. An operation on data can only be requested by the client device 300*a* being an owner the data or the biometrics reader 400*a*, or by a client device 300*b* explicitly assigned by the owner client device 300*a*. Such assignment is referred to as delegation.

The trusted server 200 is configured for enforcement of the security policies attached to the exported data. The trusted server 200 is further configured for verifying that the correct security policy is attached to data imported by sensor readers 400*a*, 400*b*, 400*c* and for validating such data. In turn, the sensor readers 400*a*, 400*b*, 400*c* are configured verify that the attached policy is followed at data import.

The trusted server 200 is further configured for verifying that data operations on registered data only are performed by the client device 300*a* or a delegated client device 300*b* of such data.

Figure 2:
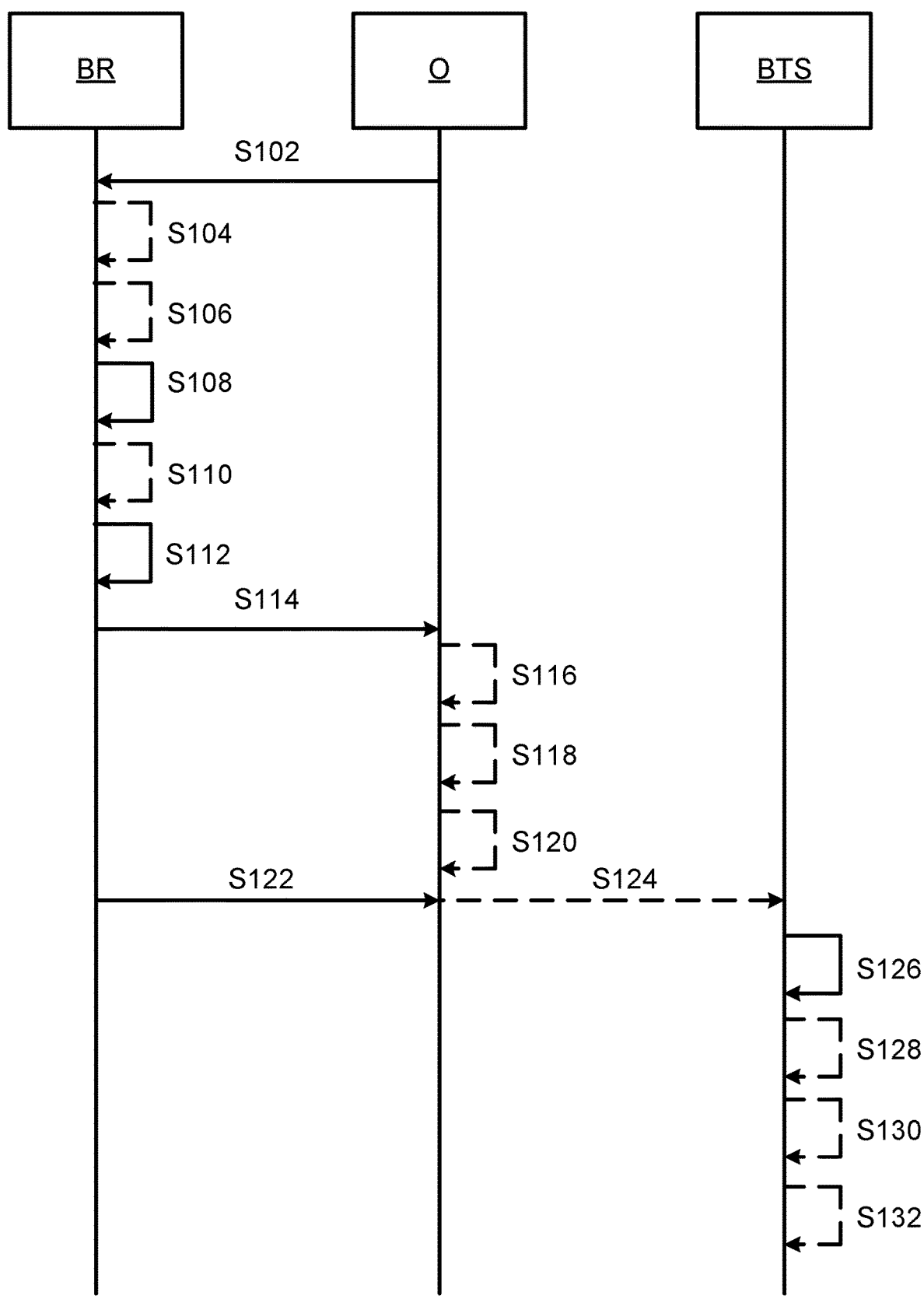
FIGS. 2-5 are signal diagrams of methods according to embodiments.

Reference is now made to FIG. 2 illustrating a method for requesting, by a client device 300*a*, registration of identified data (D) at a sensor reader 400*a* according to an embodiment. As the skilled person working with security based sensor systems understands, the term sensor reader 400*a* refers a sensor configured to read data. The client device 300*a* and the sensor reader 400*a* have a security trusted relationship with the trusted server 200.

S102: A request command is sent from the client device 300*a* to the sensor reader 400*a*. The sensor reader 400*a* thus receives the request command. The request command pertains to a registration operation (C) to be performed on identified data (D) at the sensor reader 400*a*. In this respect, the wording identified data (D) indicates that the request command pertains to a particular piece of data, and not just any piece of data. The registration operation thus pertains to registration of data (such as biometrics data and other data) from the sensor reader 400*a*, i.e. the identified data (D) to be registered is created by the sensor. The term registration operation is here thus used to distinguish the operation from the identification, or provisioning, of data which is another operation commonly performed using a sensor reader 400*a*. The term thus implies that the operation pertains to the registration (also called "enrollment") of data, and not identification of data.

S108: The sensor reader 400*a* assigns a security policy (P) to the identified data (D).

S112: The sensor reader 400*a* creates, based on the request command and the security policy (P), a first security protected object (Obj1) and a second security protected object (Obj2) of the identified data (D).

As the skilled person working with security based sensor systems understands, a security protected object is an objected that is protected by a security mechanism. The security protected object could be an encrypted and signed (biometrics) object, and hence one way to achieve the security protection of the object is to encrypt and sign the object.

S114: The second security protected object (Obj2) is sent from the sensor reader 400*a* to the client device 300*a*. The client device 300*a* thus receives the second security protected object (Obj2).

S122: The first security protected object (Obj1) is, by the sensor reader 400*a*, sent towards the trusted server 200. The trusted server 200 thus receives the first security protected object (Obj1), possible via the client device 300*a*.

S126: The trusted server 200 verifies, upon reception of the first security protected object (Obj1), that the sensor reader 400*a* that created the first security protected object (Obj1) has a security trusted relationship with the trusted server 200.

Embodiments relating to further details of requesting, by the client device 300*a*, registration of identified data (D) at the sensor reader 400*a* will now be disclosed.

In some aspects, the sensor reader 400*a* checks that the request is from its correct owner. Hence, according to an embodiment the method further comprises step S104:

S104: The sensor reader 400a verifies that the client device 300a from which the request command is received from has a security trusted relationship with the sensor reader 400a.

In some aspects, the data (D) is obtained at the sensor reader 400a. In this respect, the data (D) might either be stored data fetched from memory or fresh data captured in response to the sensor reader 400a receiving the command. Hence, according to an embodiment the method further comprises step S106:

S106: The sensor reader 400a obtains the identified data (D).

In some aspects, the sensor reader 400a performs the registration operation on the data (D). Hence, according to an embodiment the method further comprises step S110:

S110: The sensor reader 400a performs the registration operation (C) on the identified data (D), resulting in a first data item (D1) and a second data item (D2). The first data item (D1) is included in the first security protected object (Obj1) and the second data item (D2) is included in the second security protected object (Obj2).

There could be different types of second data items (D2). In some aspects, D2=Ø. That is, according to an embodiment the second data item (D2) is empty.

There could be different ways in which the security policy (P) to be assigned to the data (D) is selected. According to an embodiment, which security policy (P) to assign to the identified data (D) is dependent on the registration operation (C) and/or a default security policy of the sensor reader 400a. In some aspects the first security protected object (Obj1) comprises the security policy (P). In yet further aspects the second security protected object (Obj2) comprises the security policy (P).

The first security protected object (Obj1) might be sent together with an identifier ($ID_D$) of the identified data (D) and an identifier ($ID_R$) of the sensor reader 400a. Likewise, the second security protected object (Obj2) might be sent together with an identifier ($ID_D$) of the identified data (D) and an identifier ($ID_R$) of the sensor reader 400a.

As disclosed above, the second security protected object (Obj2) is sent from the sensor reader 400a to the client device 300a. Upon having received the second security protected object (Obj2), the client device 300a might extract the second data item (D2) and store it. Hence, according to an embodiment the method further comprises steps S116 and S118:

S116: The client device 300a extracts the second data item (D2) from the second security protected object (Obj2).

S118: The client device 300a stores the second data item (D2).

It is implicitly understood that the client device 300a first decrypts the second security protected object (Obj2) in order to extracts the second data item (D2). Thus, in some aspects the step of extracting the second data item (D2) from the second security protected object (Obj2) involves decrypting the second security protected object (Obj2).

In case the second security protected object (Obj2) is sent together with an identifier ($ID_D$) of the identified data (D) and an identifier ($ID_R$) of the sensor reader 400a, these identifiers might also be stored. Hence, according to an embodiment the method further comprises step S120:

S120: The client device 300a stores the identifier ($ID_D$) of the identified data (D) and the identifier ($ID_R$) of the sensor reader 400a together with the second data item (D2).

As disclosed above, the first security protected object (Obj1) is sent towards the trusted server 200. In this respect, according to an embodiment the first security protected object (Obj1) is sent to the client device 300a to be forwarded to the trusted server 200. The method then further comprises step S124:

S124: The client device 300a forwards the first security protected object (Obj1) to the trusted server 200. The trusted server 200 is thus assumed to receive the first security protected object (Obj1) from the client device 300a.

Upon having received the first security protected object (Obj1), the trusted server 200 might extract the first data item (D1) and store it. Particularly, according to an embodiment the trusted server 200 has access to the security policy (P). The method then further comprises steps S128 and S130:

S128: The trusted server 200 extracts the first data item (D1) from the first security protected object (Obj1).

S130: The trusted server 200 stores the first data item (D1) together with the security policy (P).

It is implicitly understood that the trusted server 200 first decrypts the first security protected object (Obj1) in order to extracts the first data item (D1). Thus, in some aspects the step of extracting the first data item (D1) from the first security protected object (Obj1) involves decrypting the first security protected object (Obj1).

In case the first security protected object (Obj1) is sent together with an identifier ($ID_D$) of the identified data (D) and an identifier ($ID_R$) of the sensor reader 400a, these identifiers might also be stored. Hence, according to an embodiment the method further comprises step S120:

S132: The trusted server 200 stores the identifier ($ID_D$) of the identified data (D) and the identifier ($ID_R$) of the sensor reader 400a together with the first data item (D1).

In some aspects the extracting in step S128 is performed only after the trusted server 200 has successfully verified that the sensor reader 400a that created the first security protected object (Obj1) has a security trusted relationship with the trusted server 200.

Figure 3:
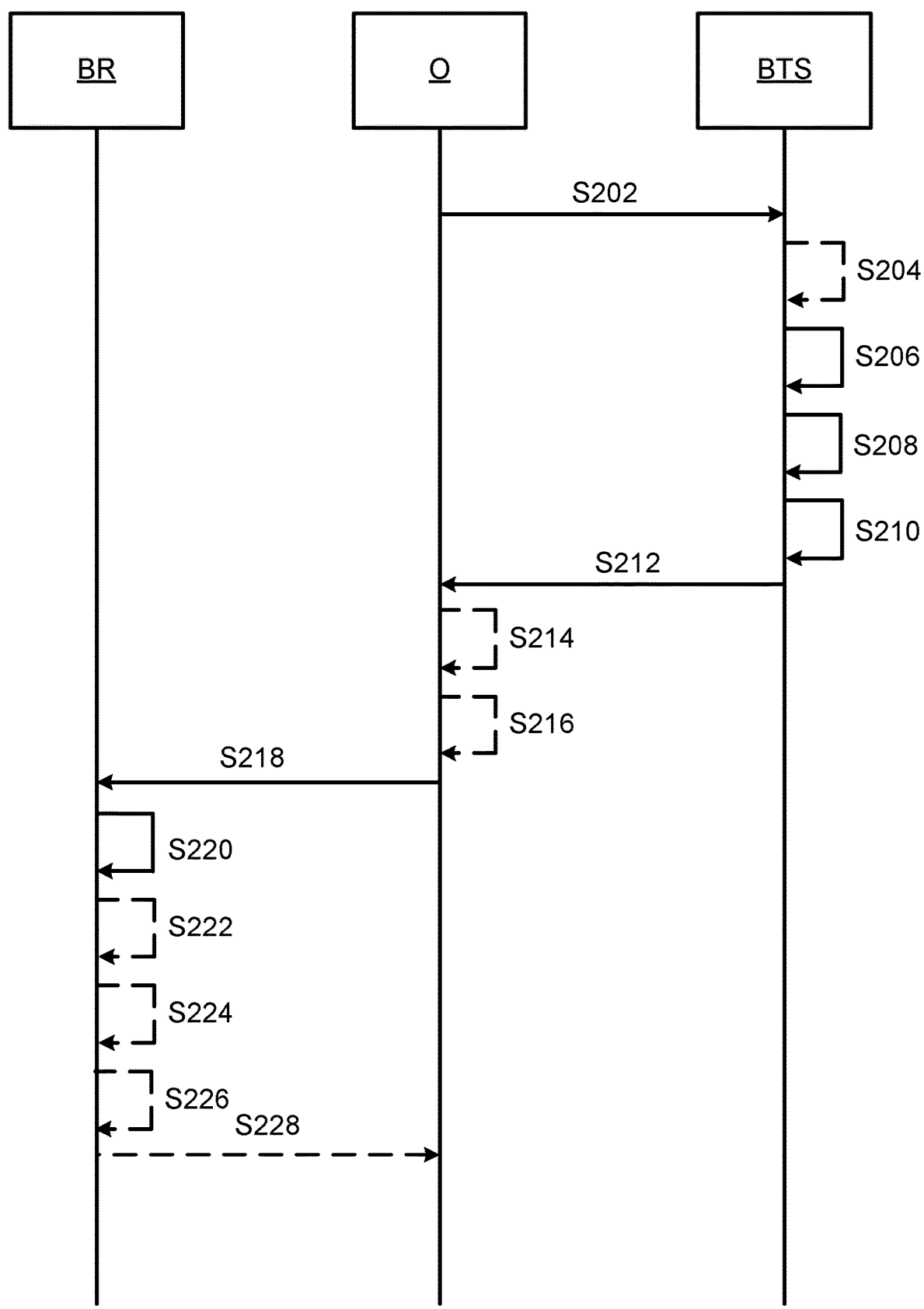

Reference is now made to FIG. 3 illustrating a method for requesting, by a client device 300a, identified data (D) to be provisioned to a sensor reader 400a according to an embodiment. The client device 300a and the sensor reader 400a have a security trusted relationship with the trusted server 200.

S202: A first request command is sent from the client device 300a to the trusted server 200. The first request command is thus received by the trusted server 200. The first request command pertains to identified data (D) to be provided to the sensor reader 400a and a first provisioning operation (C1) to be performed by the sensor reader 400a on the identified data (D). That is, data (such as biometrics data and other data) is provisioned to the sensor reader 400a (i.e., the data originates from outside the sensor reader 400a). What is referred to is thus an operation whereby data provided from outside the sensor reader 400a is provided to the sensor reader 400a for storage therein (in order to facilitate an identification service on the sensor reader 400a).

S206: The trusted server 200 retries a first data item (D1). The first data item (D1) is related to the identified data (D).

S208: The trusted server 200 verifies that the first request command complies with a security policy (P) for the identified data (D).

S210: The trusted server 200 creates, based on the security policy (P), a first security protected object (Obj1) of the first data item (D1).

S212: The first security protected object (Obj1) is sent from the trusted server 200 to the client device 300a. The client device 300a thus receives the first security protected object (Obj1).

S218: The first security protected object (Obj1) is forwarded by the client device 300a to the sensor reader 400a. The sensor reader 400a thus receives the first security protected object (Obj1).

S220: The sensor reader 400a extracts the first data item (D1) from the first security protected object (Obj1).

Embodiments relating to further details of requesting, by the client device 300a, identified data (D) to be provisioned to the sensor reader 400a will now be disclosed.

It is implicitly understood that the sensor reader 400a first decrypts the first security protected object (Obj1) in order to extracts the first data item (D1). Thus, in some aspects the step of extracting the first data item (D1) from the first security protected object (Obj1) involves decrypting the first security protected object (Obj1).

In some aspects the trusted server 200 verifies, for example by means of $ID_{OR}$, that the client device 300a is the owner of the sensor reader 400a.

Hence, according to an embodiment the method further comprises step S204:

S204: The trusted server 200 verifies that the first request command is from a legitimate client device 300a of the sensor reader 400a.

In some aspects the trusted server 200 creates an import policy (P') for the identified data (D) from the security policy (P). That is, according to an embodiment the security policy (P) for the identified data (D) is revised based on the first provisioning operation (C1).

In some aspects the client device 300a sends a second data item to the sensor reader 400a. Hence, according to an embodiment the method further comprises steps S214 and S216:

S214: The client device 300a retrieves a second data item (D2). The second data item (D2) is related to the identified data (D).

S216: The client device 300a creates a second security protected object (Obj2) of the second data item (D2).

The client device 300a sends the second security protected object (Obj2) to the sensor reader 400a together with the first security protected object (Obj1) in step S218.

The sensor reader 400a is thus assumed to receive the second security protected object (Obj2). According to an embodiment the method thus further comprises step S222:

S222: The sensor reader 400a extracts the second data item (D2) from the second security protected object (Obj2).

It is implicitly understood that the sensor reader 400a first decrypts the second security protected object (Obj2) in order to extracts the second data item (D2). Thus, in some aspects the step of extracting the second data item (D2) from the second security protected object (Obj2) involves decrypting the second security protected object (Obj2).

In some aspects the client device 300a sends a second request command, for example a protected registration request message, pertaining to a second provisioning operation (C2) to the sensor reader 400a together with the first security protected object (Obj1). Hence, according to an embodiment a second provisioning operation (C2) to be performed on the identified data (D) at the sensor reader 400a is sent together with the first security protected object (Obj1). The sensor reader 400a is thus assumed to receive the second request command.

The sensor reader 400a performs the second provisioning operation (C2) on the first data item (D1) under the policy (P'). Hence, according to an embodiment the method further comprises step S224:

S224: The sensor reader 400a performs the second provisioning operation (C2), as constrained by the security policy (P), on the first data item (D1).

The sensor reader 400a performs the second provisioning operation (C2) on the second data item (D2) under the policy (P'). Hence, according to an embodiment the method further comprises step S226:

S226: The sensor reader 400a performs the second provisioning operation (C2), as constrained by the security policy (P), on the second data item (D2).

In some aspects the sensor reader 400a, upon having performed the second provisioning operation (C2), sends a confirmation message thereof to the client device 300a. Hence, according to an embodiment the method further comprises step S228:

S228: The sensor reader 400a sends a confirmation message of the second provisioning operation (C2) having been performed to the client device 300a. The client device 300a is thus assumed to receive the conformation message.

Aspects, examples, and embodiments applicable for any of the above disclosed methods will now be disclosed.

In some aspects the client device 300a is delegated by another client device 300b for sending the request commands. Particularly according to an embodiment the client device 300a is assigned by another client device 300b for sending the request commands. Further aspects relating thereto will be disclosed below.

All communications between the client device 300a, the sensor reader 400a and the trusted server 200 might be over authenticated, integrity and confidentiality protected communications channels.

There could be different examples of data (D). According to a non-limiting example, the data is at least part of a biometrics template, at least part of a transformed biometrics template, at least part of a biometric match candidate, at least part of matching data obtained when trying to match biometrics candidate data against one or several biometrics templates, a template transform key, and/or a template encryption key.

There could be different examples of security policies (P). According to a non-limiting example, the security policy (P) relates to type of operations allowed to be performed on the identified data (D), whether or not the identified data (D) is allowed to be used for central matching operations, whether or not the identified data (D) is allowed to be used for local matching operations, a highest number of allowable matching operations to be performed using the identified data (D), a highest number of allowable provisioning operations to be performed using the identified data (D), a validity period for when in time the operation is allowed to be performed on the identified data (D), and/or a geographical area in which the operation is allowed to be performed on the identified data (D).

There could be different examples of sensor readers 400a, 400b, 400c. According to a non-limiting example the sensor reader 400a, 400b, 400c is a biometrics sensor reader. In this respect the biometrics sensor reader could be configured to read, store, export, and/or import biometrics data such as, but not limited to, fingerprint data, palm print data, hand geometry data, palm veins data, face recognition data, iris recognition data, retina recognition data, and voice recognition data.

Aspects, examples, and embodiments relating to security pre-configurations as applicable for any of the above disclosed methods will now be disclosed In some aspects, each sensor reader 400a is pre-configured with $PkE_{BTS}$, and $PkS_{SBTS}$. The herein disclosed embodiments are agnostic with respect to how this configuration is performed but it should be performed using a high secure procedure making sure that the public key values are transferred in a strictly controlled way, such that there is no possibility for an attacker to exchange or modify the public key values during configuration. Furthermore, the key parameters should be stored at the sensor reader 400a in integrity protected memory, making sure it is difficult for a potential attacker to delete or modify the values.

In some aspects, each sensor reader 400a, 400b, 400c is further pre-configured with ($PrE_R$, $PkE_R$), ($PrS_R$, $PkS_R$), and $CertE_R$, $CertS_R$). The herein disclosed embodiments are agnostic with respect to how the sensor reader 400a generates or obtains these public key pairs. One option is to generate them onboard, i.e. on-the-fly inside the secure execution environment of the sensor reader 400a. Another option is that the sensor reader 400a receives these key through a secure configuration process during manufacture or at a separate secure customization procedure. In some aspects it is assumed that the keys are certified by a trusted Certificate Authority (CA) function. This CA is assumed to be under direct control by the trusted server 200 or at least fully trusted by the trusted server 200.

In some aspects, the client device 300a is pre-configured ($PrE_{OR}$, $PkE_{OR}$), ($PrS_{OR}$, $PkS_R$), $CertE_{OR}$, and $CertS_{OR}$. These keys and certificate should be securely generated but the herein disclosed embodiments are not dependent on any particular ley generation or certification procedure.

In some aspects it is further assumed that each sensor reader 400a, 400b, 400c is associated with a unique one of the client devices 300a. This client device 300a is assumed to be assigned at the first time use of the sensor reader 400a using a secure procedure for establishing ownership. The herein disclosed embodiments are not limited to any particular ownership configuration procedure but one option is to require the user to enter a unique personal identification (PIN) code or password at both the sensor reader 400a and the client device 300a during the ownership configuration.

In some aspects, after a successful ownership configuration, the sensor reader 400a, 400b, 400c has access to, and stores in integrity protected memory, the parameters $CertE_{OR}$, $CertS_{OR}$.

Furthermore, in some aspects the execution environment of the client devices 300a is assumed, after such a process, to have access to, and stored in integrity protected memory, the parameters $CertE_R$, $CertS_R$.

Furthermore, in some aspects, during ownership configuration, the sensor reader 400a, 400b, 400c initialize a monotonic counter value, $N_R=0$. The client device 300a is then also assumed to set a corresponding counter value $N_R=0$.

Figure 4:
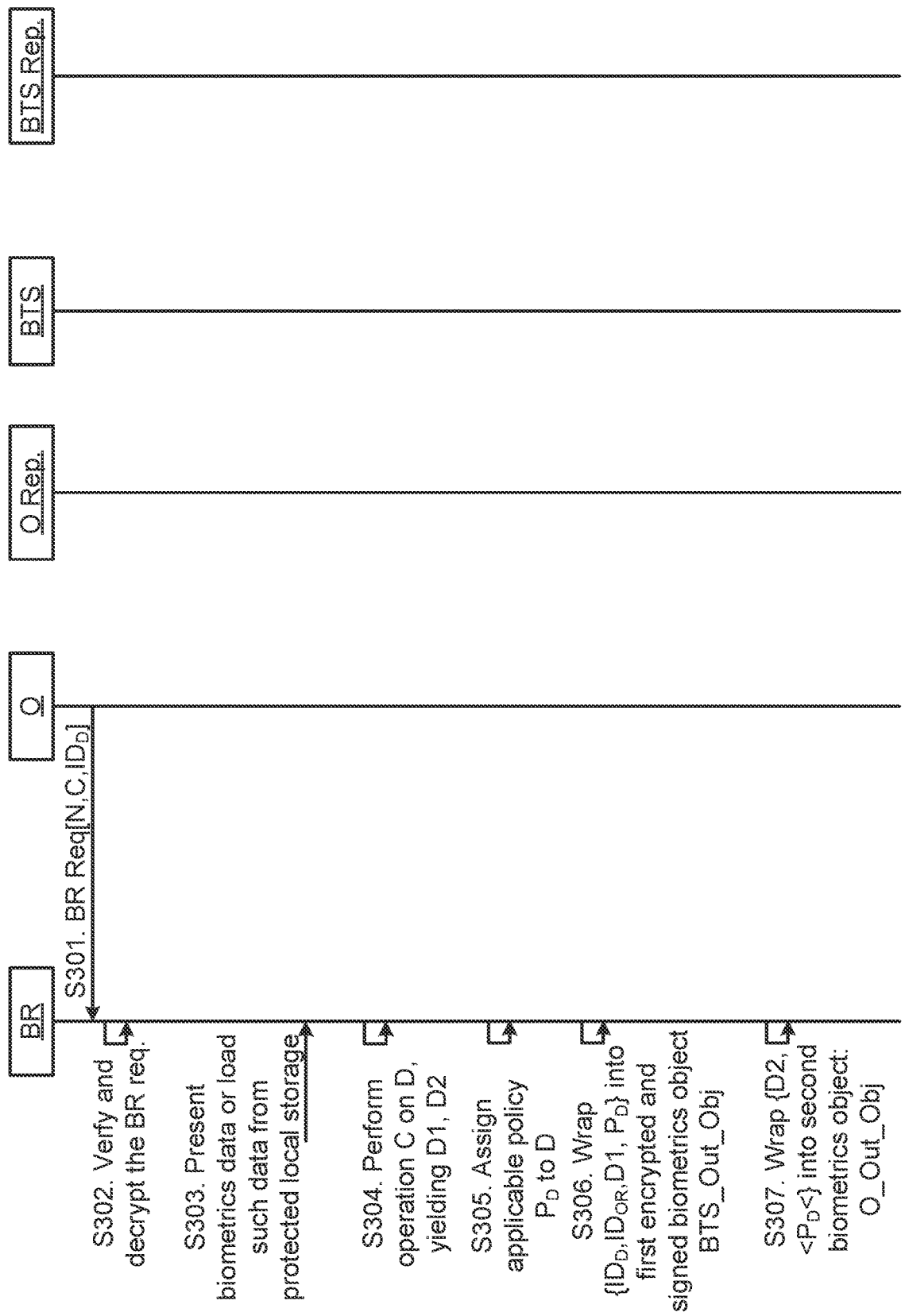

One particular embodiment for requesting, by the client device 300a, registration of identified data (D) at the sensor reader 400a based on at least some of the above disclosed embodiments will now be disclosed in detail with reference to the signalling diagram of FIG. 4. The client device 300a has access to a data storage denoted "O Rep." and the trusted server 200 has access to a data storage denoted "BTS Rep.", where Rep. is short for repository.

The above denoted first security protected object (Obj1) and second security protected object (Obj2) will in this particular embodiment be exemplified by BTS_Out_Obj and O_Out_Obj, respectively.

S301: A client device 300a of a sensor reader 400a wants to perform an operation on biometrics data captured by the sensor reader 400a. The operation is encoded into a command, C. The client device 300a either includes a unique reference, $ID_D$, for the biometrics data, D, that it wants to apply the command C to (for example in scenarios where the biometrics data already is captured and stored on the sensor reader 400a and the command is about to be applied on such stored data), or it assigns such identifier to the data (for example in scenarios where the biometrics data subject to the operation is expected to be captured instantly by the sensor reader 400a). Next, the client device 300a assigns a counter value, N (using its stored counter reference for the sensor reader 400a), to the request message about to be sent. The parameters {N, C, $ID_D$} are then included in a protected registration request message sent to the sensor reader 400a. In order to obtain protection the following operations are performed: {C, $ID_D$} are encrypted with the help of $PkE_R$, i.e. the parameters are encrypted with a symmetric key which in turn is encrypted with $PkE_R$ and then the encrypted message together with N is signed with the help of $PrS_{OR}$.

S302: Upon receiving the message from the client device 300a in step S301 above, the sensor reader 400a performs the following verification and decryption operations:

The sensor reader 400a checks that the received counter value $N \geq N_R$. If $N < N_R$, the procedure is aborted with an error message.

The sensor reader 400a uses its stored client device signing certificate reference, $CertS_{OR}$, to verify the signature of the message in step S301. If the verification fails, the procedure is aborted with an error message; the sensor reader 400a only accepts registration requests from its current owner, as defined by the client device 300a.

The sensor reader 400a decrypts the message received in step S301 using $PrE_R$.

S303: The sensor reader 400a parses the command C and $ID_D$. If C indicates an operation on existing biometrics data D, the data corresponding to $ID_D$ is fetched from memory, if not, sensor reader 400a captures fresh biometrics data D, from a user and assigns $ID_D$ to the captured data.

S304: The sensor reader 400a performs the operation C on the biometrics data D, resulting in one or two new biometrics data parameters: D1, and D2. According to one embodiment, D1=D and D2=Ø. That is, D2 might be an empty object.

S305: The sensor reader 400a assign a biometrics usage policy, $P_D$, to the biometrics data D. Exactly which policy that will be assigned to the biometrics data D depends on the type of command that has been requested by the client device 300a as well as pre-configured default policy parameters applying to the sensor reader 400a.

S306: The sensor reader 400a wraps {$ID_D$, $ID_R$, $ID_{OR}$, D1, $P_D$} into an encrypted and signed biometrics object, BT_Out_Obj, intended for the trusted server 200. The object is protected in the following ways:

{$ID_D$, $ID_{OR}$, D1, $P_D$} are encrypted with the help of $PkE_{BTS}$, i.e. the parameters are encrypted with a symmetric key which in turn is encrypted with $PkE_{BTS}$ and then the encrypted message is turn signed with the help of $PrS_R$.

S307: D2 (and optionally $P_D$) are included into a second (not self-protected) object, O_Out_Obj, intended for the client device 300a.

S308: BTS_Out_Obj and O_Out_Obj are together with N included in a protected response message to the client device 300a. This response message is protected by O_Out_Obj being encrypted with the help of $PkE_{OR}$, i.e. the parameters are encrypted with a symmetric key which in turn is encrypted with $PkE_{OR}$. This encrypted message is together with N and BTS_Out_Obj signed with the help of $PrS_R$.

S309: The sensor reader 400a steps up its monotonic counter value; $N_R=N$.

S310: The sensor reader 400a sends the protected message prepared in step S308 to the client device 300a.

S311: The client device 300a verifies and decrypts the received response message. The verification and decryptions operations include the following processing:

The client device 300a verifies that the received counter value, N', corresponds to the previously sent value N. If the received counter value, N', does not correspond to the previously sent value N the procedure is aborted.

The client device 300a verifies the signature of the received response message with the help of the public key in $CertS_R$.

The client device 300a decrypts O_Out_Obj with the help of the key $PrE_{OR}$.

S312: The client device 300a stores D2 together with $ID_D$ and $ID_R$ in a protected repository.

S313: The client device 300a steps up its internal counter reference for sensor reader 400a; N=N+1.

S314: The client device 300a establishes an authenticated, integrity and confidentiality protected channel with the trusted server 200. The authentication is assumed to be done using the key $PrS_{OR}$. Through this protected channel it sends a biometrics data registration request containing at least the parameters: $CertS_R$, $ID_D$, and BTS_Out_Obj.

S315: After receiving the registration request at step S314, the trusted server 200 performs the following verification and decryption procedures:

The CA signature of $CertS_R$ is verified to make sure that the certificate of the sensor reader 400a is issued by the common trusted CA.

The signature BTS_Out_Obj is checked against public key of the sensor reader 400a in the received $CertS_R$. If the verification fails, the registration procedure is aborted.

BTS_Out_Obj is decrypted with the help of $PkE_{BTS}$.

$ID_{OR}=h(PrS_{OR})$ in the decrypted and verified object is checked against the public key, $PrS_{OR}$, used by the client device 300a for authentication in the secure channel set-up in step S314. If the verification fails, the procedure is aborted.

S316: The trusted server 200 stores the new record containing at least the parameters, $ID_D$, D1, $P_D$, $ID_{OR}$, in its biometrics database.

Figure 5:
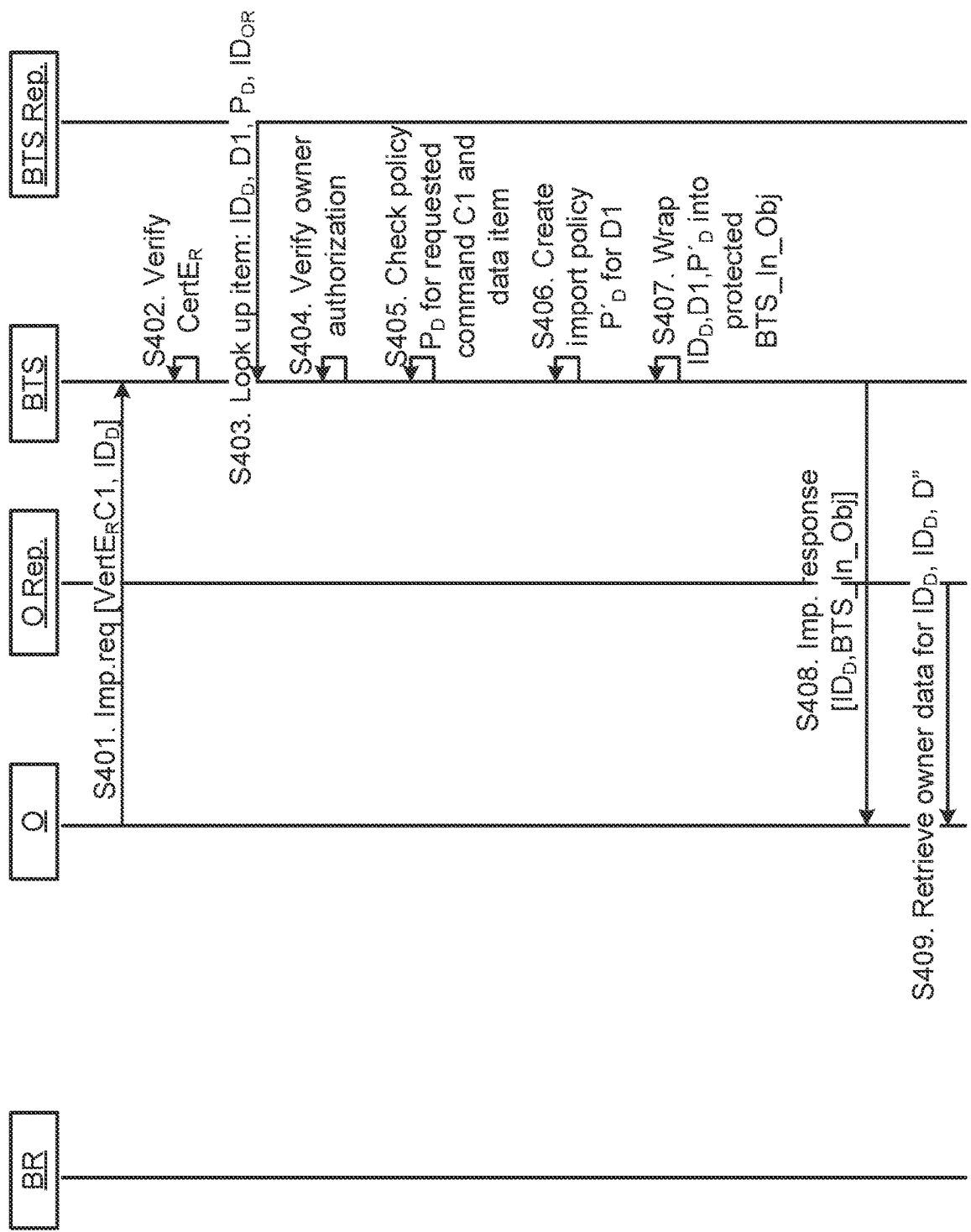

One particular embodiment for requesting, by the client device 300a, identified data (D) to be provisioned to the sensor reader 400a according to an embodiment based on at least some of the above disclosed embodiments will now be disclosed in detail with reference to the signalling diagram of FIG. 5. The client device 300a has access to a data storage denoted "O Rep." and the trusted server 200 has access to a data storage denoted "BTS Rep.", where Rep. is short for repository.

The above denoted first security protected object (Obj1) and second security protected object (Obj2) will in this particular embodiment be exemplified by BTS_In_Obj and O_In_Obj, respectively.

The sensor reader 400a in this procedure is typically a different sensor reader 400a than the one used for the registration procedure in FIG. 4 but it has the same client device 300a (or at least a client device 300a authorized through delegation, to perform an import action) as the client device 300a of the sensor reader 400a used for the registration procedure in FIG. 4.

S401: The client device 300a looks-up, or selects, the sensor reader 400a subject to a biometrics data import operation. The sensor reader 400a is represented by its unique encryption certificate, $CertE_R$. The client device 300a also looks-up the biometrics record, $ID_D$, subject to the import operation. $CertE_R$ and $ID_D$ are sent in an authenticated, integrity and confidentiality protected import request, C1, to the trusted server 200. The authentication is assumed to be done using the key $PrS_{OR}$.

S402: After receiving the registration request at step S401, the trusted server 200 verifies the CA signature of $CertE_R$, to make sure that the certificate of the sensor reader 400a is issued by the common trusted CA.

S403: The trusted server 200 looks up the requested biometrics data item with $ID_D$:$ID_D$, D1, $P_D$, $ID_{OR}$.

S404: The trusted server 200 checks $ID_{OR}=h(PrS_{OR})$ in the record against the public key, $PrS_{OR}$, used by the client device 300a for authentication in the secure channel set-up in step S401. If the verification fails, the procedure is aborted; only client devices registered or delegated for the item are allowed to perform an import action on the item.

S405: The trusted server 200 checks the policy for the biometrics record, $P_D$, against the requested import command, C1. If $P_D$ for instance indicates that an import not is allowed on the record or the policy does not allow an import to a device type indicated in $CertE_R$, the procedure is aborted with an error message back to the client device 300a.

S406: Based on the biometrics operation, C1, requested by the client device 300a, the trusted server 200 creates an import policy, $P'_D$, for the biometrics data item subject to import. According to one embodiment, simply $P'_D=P_D$, but according to an alternative embodiment, $P'_D$ is derived from $P_D$ and further policy determine data such as the for instance time validity constraints indicated in C1 or general time validity restrictions applied by the trusted server 200 to all import biometrics data items.

S407: The trusted server 200 wraps $ID_D$, D1, $P'_D$ into a protected object, BTS_In_Obj, targeting the sensor reader 400a. The object is protected by {$ID_D$, D1, $P'_D$} being encrypted with the help of $PkE_R$, i.e. the parameters are encrypted with a symmetric key which in turn is encrypted with $PkE_R$ and then the encrypted message is turn signed with the help of $PrS_{BTS}$.

S408: The trusted server 200 returns BTS_In_Obj to the client device 300a in a response message over the confidentiality and integrity protected channel.

S409: The client device 300a looks up the record {$ID_D$, D2} in its internal repository.

S410: The client device 300a wraps {$ID_D$, D2} into an (unprotected) object O_In_Obj.

S411: The client device 300a assigns a counter value, N, for example using its stored counter reference for the sensor reader 400a, to the request message about to be sent to the sensor reader 400a. The client device 300a also decides a biometrics data import command, C2, that it wants to execute on the data subject to import to the sensor reader 400a. The parameters {N, C2, BTS_In_Obj, O_In_Obj} are then included into a protected registration request message sent to the sensor reader 400a. The protection comprises encrypting {N,C2,O_In_Obj} with the help of $PkE_R$, i.e. the parameters are encrypted with a symmetric key which in turn is encrypted with $PkE_R$ and then the encrypted message together with BTS_In_Obj are signed with the help of $PrS_{OR}$. O_In_Obj is thus security protected by means of encryption.

S412: The client device 300a sends the protected message prepared in step S411 to the sensor reader 400a.

S413: Upon receiving the message from the client device 300a in step S412, the sensor reader 400a performs the following verifications and decryption operations:

The sensor reader 400a checks the received counter value $N \geq N_R$. If $N < N_R$, the procedure is aborted with an error message.

The sensor reader 400a uses its stored signing certificate reference, $CertS_{OR}$, of the client device 300a to verify the signature of the message. If the verification fails, the procedure is aborted with an error message; the sensor reader 400a only accepts registration requests from the current client device 300a.

The sensor reader 400a decrypts the message using $PrE_R$.

S414: The sensor reader 400a verifies and decrypts BTS_In_Obj:

The sensor reader 400a uses its stored public key, $PkS_{SBTS}$, of the trusted server 200 to verify the signature of BTS_In_Obj. If the verification fails, the procedure is aborted with an error message.

The sensor reader 400a decrypts the object using $PrE_R$.

S415: The sensor reader 400a verifies that the parameter $ID_D$ received in O_In_Obj is equal to the corresponding parameter in the decrypted BTS_In_Obj. If the verification fails, the procedure is aborted with an error.

S416: The sensor reader 400a installs the decrypted biometrics values, D1, D2 and applies the command C2 under policy $P'_D$ for the just imported parameters.

S417: The sensor reader 400a sends an import confirmation message back to the client device 300a.

As disclosed above, in some aspects the client device 300a is delegated by another client device 300b for sending the request commands. Further details relating thereto will now be disclosed.

The herein disclosed embodiments allow delegation of application domain data ownership. As will be disclosed next, delegation might be performed during data export and/or prior to data import.

Aspects of delegation during data export will now be disclosed.

It might be the case that the client device 300a is configured to give out usage right of exported data to a different client device 300b. In that case, the client device 300b to be linked to the data at the trusted server 200 is not the original client device 300a. Furthermore, in such case, several delegation passes might even be enabled.

When delegation during data export is applied, the delegation is assumed to be performed prior to the registration of the BTS_Out_Obj at the trusted server 200, or more generally, the first security protected object (Obj1). The delegation will then be performed after step S311 in FIG. 4. A delegation is a delegation proof in the form of a chain, R*, of signatures and certificates. In particular consider the case where $R* = 1$ $ID_{OR}$, $CertS_{OR}$, $\{sig_{x2}, CertS_{x2}\}$, ..., $\{sig_{xn}, CertS_{xn}\}$, where $sig_{xi}$ is the public key signature over all previous items in the chain and $CertS_{xn}$ is the last certificate in the chain. Hence, in a delegation situation, $CertS_{xn}$ replaces the role of the certificate $CertS_{OR}$ during the data export. In step S310 in FIG. 4, the thus delegated client device 300b (i.e., the holder of $CertS_{xn}$) will instead of the source client device 200a make the registration with the trusted server 200. Furthermore, R* is added to the registration request. When the trusted server 200 receives the registration request, it then verifies the complete chain R* and make sure the source of the chain corresponds to R*, and then registers the data item with reference to $CertS_{xn}$ instead of R*.

Aspects of delegation prior to data import will now be disclosed.

It is also possible to use the herein disclosed embodiments with delegation prior to data import. In this case, it is still the source client device 200a that performs the original registration with the trusted server 200. But instead, it is a delegated client device 200b that requests a previous registered data item from the trusted server 200. This means, with reference to step S401 of FIG. 5, that a delegation proof chain, R', is submitted to the trusted server 200 when requesting import of a data item. This implies that the delegation chain must be created prior to the instance when the data import occurs. Delegation prior to data import can be performed to allow multiple delegated client devices 200b to have access right to a single registered data item.

The herein disclosed embodiments can be applied in different types of distributed, multi-user, multiple devices authentication and identification scenarios.

According to a physical access control scenario, a user registers his/her biometrics template at the trusted server 200 using a personal client device 300a with a security policy stating that the biometrics data shall only be valid for single day after import. During export, the keys used to encrypt the template are included in D1, while D2 contains the encrypted template. Later, the user for one day temporary visits an office building. The user then uses his/her personal client device 300a to delegate the biometrics template imports right to the office building administration domain with several physical locks (having its own sensor reader 400a) guarded by biometrics identification. The building administrator is then able to download the end-user biometrics template to the locks in the building where the user is supposed to have access using the import principle described in the herein disclosed embodiments. This allows the user for one day to have access through biometrics authentication to the building.

According to a central identification scenario, several users register public template as well as encrypted, private, template data (D1) at the trusted server 200 while private template individual encryption keys (D2) are provided to a common application domain. Later, when, a user, by means of his/her private client device 300a, uses a different sensor reader 400a for central identification at the very same application domain, the export principle described in the herein disclosed embodiments are applied to export biometrics "matching candidate data" to the application domain which uses the data to issue a first matching request to the trusted server 200 in the form of an export registration. The result of the first match is then returned to the trusted server 200 in the form of biometrics import data, IO1, targeting the client device 300a used by the user for identification. This client device 300a adds, to the import data, key material data, as defined by the second security protected object (Obj2), which is returned to the sensor reader 400a. The sensor reader 400a uses the received biometrics data to calculate a second set of matching data which is exported to the application domain, which can forward it to the trusted server 200 for final matching through a biometrics data export request. The application gets as return to the export request, the final identification result.

As have been shown in the above two illustrative examples, the herein disclosed embodiments enable many highly secure biometrics data protection options (all biometrics exchanges are integrity and confidentiality protected in sealed objects) while still enabling relatively simple key management configuration at the sensor readers 400a. Each sensor reader 400a only needs to have shared trust with the trusted server 200 as well as with the client device 300a. Still, through the delegation principle enabled by the herein disclosed embodiments, biometrics data export and import rights can be delegated in a flexible way while biometrics data usage policies always are guarded by the trusted server 200.

Figure 6:
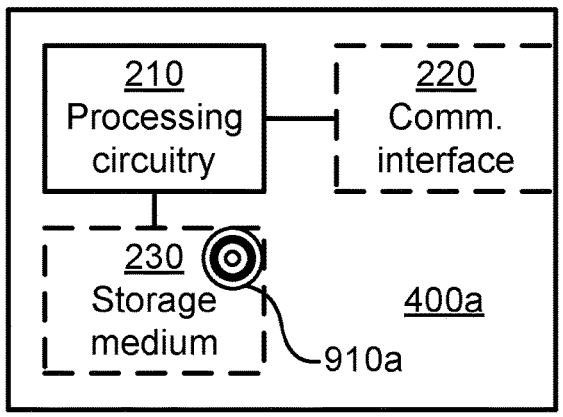
FIG. 6 is a schematic diagram showing functional units of a sensor reader according to an embodiment.

FIG. 6 schematically illustrates, in terms of a number of functional units, the components of a sensor reader 400a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the sensor reader 400a to perform a set of operations, or steps, as disclosed above. For example, the storage medium 230 may store the set of operations, and the processing circuitry 210 may be configured to retrieve the set of operations from the storage medium 230 to cause the sensor reader 400a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The sensor reader 400a may further comprise a communications interface 220 for communications at least with client devices 300a and the trusted server 200. As such the communications interface 220 may comprise one or more transmitters and receivers, comprising analogue and digital components.

The processing circuitry 210 controls the general operation of the sensor reader 400a e.g. by sending data and control signals to the communications interface 220 and the storage medium 230, by receiving data and reports from the communications interface 220, and by retrieving data and instructions from the storage medium 230. Other components, as well as the related functionality, of the sensor reader 400a are omitted in order not to obscure the concepts presented herein.

Figure 7:
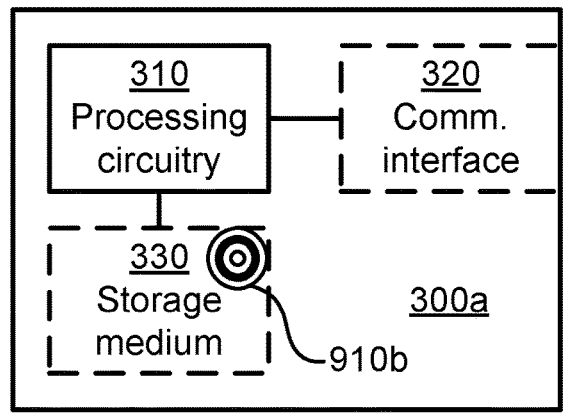
FIG. 7 is a schematic diagram showing functional units of a client device according to an embodiment.

FIG. 7 schematically illustrates, in terms of a number of functional units, the components of a client device 300a according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the client device 300a to perform a set of operations, or steps, as disclosed above. For example, the storage medium 330 may store the set of operations, and the processing circuitry 310 may be configured to retrieve the set of operations from the storage medium 330 to cause the client device 300a to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The client device 300a may further comprise a communications interface 320 for communications at least with the trusted server 200 and sensor readers 400a. As such the communications interface 320 may comprise one or more transmitters and receivers, comprising analogue and digital components.

The processing circuitry 310 controls the general operation of the client device 300a e.g. by sending data and control signals to the communications interface 320 and the storage medium 330, by receiving data and reports from the communications interface 320, and by retrieving data and instructions from the storage medium 330. Other components, as well as the related functionality, of the client device 300a are omitted in order not to obscure the concepts presented herein.

Figure 8:
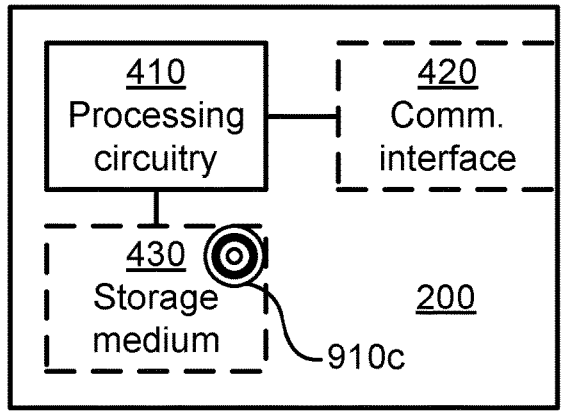
FIG. 8 is a schematic diagram showing functional units of a trusted server according to an embodiment.

FIG. 8 schematically illustrates, in terms of a number of functional units, the components of a trusted server 200 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 430. The processing circuitry 410 may further be provided as at least one application specific integrated circuit (ASIC), or field programmable gate array (FPGA).

Particularly, the processing circuitry 410 is configured to cause the trusted server 200 to perform a set of operations, or steps, as disclosed above. For example, the storage medium 430 may store the set of operations, and the processing circuitry 410 may be configured to retrieve the set of operations from the storage medium 430 to cause the trusted server 200 to perform the set of operations. The set of operations may be provided as a set of executable instructions. Thus the processing circuitry 410 is thereby arranged to execute methods as herein disclosed.

The storage medium 430 may also comprise persistent storage, which, for example, can be any single one or combination of magnetic memory, optical memory, solid state memory or even remotely mounted memory.

The trusted server 200 may further comprise a communications interface 420 for communications at least with client devices 300a and sensor readers 400a. As such the communications interface 420 may comprise one or more transmitters and receivers, comprising analogue and digital components.

The processing circuitry 410 controls the general operation of the trusted server 200 e.g. by sending data and control signals to the communications interface 420 and the storage medium 430, by receiving data and reports from the communications interface 420, and by retrieving data and instructions from the storage medium 430. Other components, as well as the related functionality, of the trusted server 200 are omitted in order not to obscure the concepts presented herein.

Any of the sensor reader 400a, the client device 300a, and the trusted server 200 may be provided as a standalone device or as a part of at least one further device. Thus, a first portion of the instructions performed by the sensor reader 400a, the client device 300a, and/or the trusted server 200 may be executed in a first device, and a second portion of the of the instructions performed by the sensor reader 400a, the client device 300a, and/or the trusted server 200 may be executed in a second device; the herein disclosed embodiments are not limited to any particular number of devices on which the instructions performed by the sensor reader 400a, the client device 300a, and/or the trusted server 200 may be executed. Hence, the methods according to the herein disclosed embodiments are suitable to be performed by a sensor reader 400a, client device 300a, and/or the trusted server 200 residing in a cloud computational environment. Therefore, although a single processing circuitry 210, 310, 410 is illustrated in FIGS. 6, 7, and 8 the processing circuitry 210, 310, 410 may be distributed among a plurality of devices, or nodes. The same applies to the computer programs 920a, 920b, 920c of FIG. 9 (see below).

Figure 9:
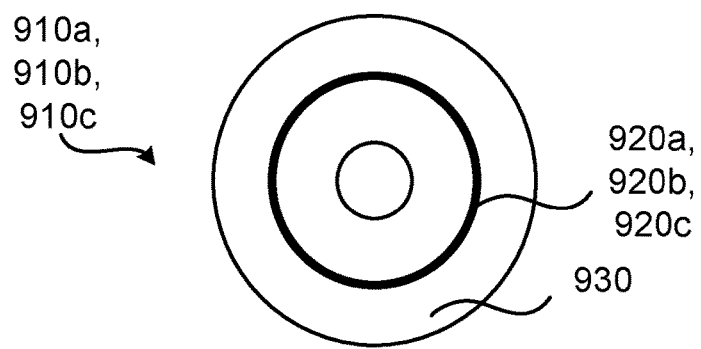
FIG. 9 shows one example of a computer program product comprising computer readable means according to an embodiment.

FIG. 9 shows one example of a computer program product 910a, 910b, 910c comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the sensor reader 400a as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the client device 300a as herein disclosed. On this computer readable means 930, a computer program 920c can be stored, which computer program 920c can cause the processing circuitry 410 and thereto operatively coupled entities and devices, such as the communications interface 420 and the storage medium 430, to execute methods according to embodiments described herein. The computer program 920c and/or computer program product 910c may thus provide means for performing any steps of the trusted server 200 as herein disclosed.

In the example of FIG. 9, the computer program product 910a, 910b, 910c is illustrated as an optical disc, such as a CD (compact disc) or a DVD (digital versatile disc) or a Blu-Ray disc. The computer program product 910a, 910b, 910c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b, 920c is here schematically shown as a track on the depicted optical disk, the computer program 920a, 920b, 920c can be stored in any way which is suitable for the computer program product 910a, 910b, 910c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for requesting, by a client device, registration of identified biometric data at a biometric sensor reader, wherein the client device and the biometric sensor reader have a security trusted relationship with a trusted server, the method comprising:
    sending a request command, from the client device and to the biometric sensor reader, the request command pertaining to a registration operation to be performed on identified biometric data at the biometric sensor reader;
    assigning, by the biometric sensor reader, a security policy to the identified biometric data;
    creating, by the biometric sensor reader and based on the request command and the security policy, a first security protected object and a second security protected object of the identified biometric data, wherein the first security protected object and the second security protected object each comprise an encrypted and signed biometrics object, and wherein the first security protected object is different from the second security protected object;
    sending, by the biometric sensor reader, the second security protected object to the client device;
    sending, by the biometric sensor reader, the first security protected object towards the trusted server; and
    verifying, by the trusted server and upon reception of the first security protected object, that the biometric sensor reader that created the first security protected object has a security trusted relationship with the trusted server.

2. The method according to claim 1, further comprising:
    verifying, by the biometric sensor reader, that the client device from which the request command is received from has a security trusted relationship with the biometric sensor reader.

3. The method according to claim 1, further comprising:
    obtaining, by the biometric sensor reader, the identified biometric data.

4. The method according to claim 1, further comprising:
    performing, by the biometric sensor reader, the registration operation on the identified biometric data, resulting in a first data item and a second data item, wherein the first data item is included in the first security protected object and the second data item is included in the second security protected object.

5. The method according to claim 1, wherein which security policy to assign to the identified biometric data is dependent on at least one of the registration operation and a default security policy of the biometric sensor reader.

6. The method according to claim 4, further comprising:
    extracting, by the client device, the second data item from the second security protected object; and
    storing, by the client device, the second data item.

7. The method according to claim 6, further comprising:
    storing, by the client device, the identifier of the identified biometric data and the identifier of the biometric sensor reader together with the second data item.

8. The method according to claim 1, wherein the first security protected object is sent to the client device to be forwarded to the trusted server, the method further comprising:
    forwarding, by the client device, the first security protected object to the trusted server.

9. The method according to claim 4, wherein the trusted server has access to the security policy, the method further comprising:
    extracting, by the trusted server, the first data item from the first security protected object; and
    storing, by the trusted server, the first data item together with the security policy.

10. The method according to claim 9, further comprising:
    storing, by the trusted server, the identifier of the identified biometric data and the identifier of the biometric sensor reader together with the first data item.

11. A method for requesting, by a client device, identified biometric data to be provisioned to a biometric sensor reader, wherein the client device and the biometric sensor reader have a security trusted relationship with a trusted server, the method comprising:
    sending a first request command, from the client device and to the trusted server, the first request command pertaining to identified biometric data to be provided to the biometric sensor reader and a first provisioning operation to be performed by the biometric sensor reader on the identified biometric data;
    retrieving, by the trusted server, a first data item, wherein the first data item is related to the identified biometric data;
    verifying, by the trusted server, that the first request command complies with a security policy for the identified biometric data;
    creating, by the trusted server and based on the security policy, a first security protected object of the first data item, wherein the first security protected object comprises an encrypted and signed biometrics object;
    sending, from the trusted server and to the client device, the first security protected object;
    forwarding, by the client device, the first security protected object to the biometric sensor reader; and
    extracting, by the biometric sensor reader and from the first security protected object, the first data item.

12. The method according to claim 11, further comprising:
    verifying, by the trusted server, that the first request command is from a legitimate client device of the biometric sensor reader.

13. The method according to claim 11, wherein the security policy for the identified biometric data is revised based on the first provisioning operation.

14. The method according to claim 11, further comprising:
    retrieving, by the client device, a second data item, wherein the second data item is related to the identified biometric data; and
    creating, by the client device, a second security protected object of the second data item, wherein the second security protected object comprises an encrypted and signed biometrics object that is different from the first security protected object; and
    wherein the second security protected object is sent together with the first security protected object from the client device to the biometric sensor reader.

15. The method according to claim 14, further comprising:
    extracting, by the biometric sensor reader and from the second security protected object, the second data item.

16. The method according to claim 14, wherein a second request command pertaining to a second provisioning operation to be performed on the identified biometric data at the biometric sensor reader is sent together with the first security protected object.

17. The method according to claim 16, further comprising: performing, by the biometric sensor reader, the second provisioning operation, as constrained by the security policy, on the first data item.

18. The method according to claim 16, further comprising:
    performing, by the biometric sensor reader, the second provisioning operation, as constrained by the security policy, on the second data item.

19. The method according to claim 17, further comprising:
    sending, by the biometric sensor reader and to the client device, a confirmation message of the second provisioning operation having been performed.

* * * * *